United States Patent [19]

Goheen

[11] 4,270,492

[45] Jun. 2, 1981

[54] QUICK HITCH FOR ANIMALS OR THE LIKE

[76] Inventor: Eugene E. Goheen, 22169 S. Garden Ave., Hayward, Calif. 94541

[21] Appl. No.: 63,394

[22] Filed: Aug. 3, 1979

[51] Int. Cl.³ .............................................. A01K 3/00
[52] U.S. Cl. ................................... 119/118; 114/230
[58] Field of Search ............... 119/109, 111, 118, 153; 54/34; 114/249, 251, 230; 24/115 R, 115 F, 128 R, 129 R, 129 B, 49 S, 131 C; 248/328

[56] References Cited

U.S. PATENT DOCUMENTS

| 469,254 | 2/1892 | Kelley | 119/118 |
| 3,094,755 | 6/1963 | Casanave | 114/230 X |
| 4,125,302 | 11/1978 | Peritz et al. | 248/328 X |

*Primary Examiner*—Gene Mancene
*Assistant Examiner*—Robert P. Swiatek
*Attorney, Agent, or Firm*—Alvin E. Hendricson; William R. Piper

[57] ABSTRACT

A quick hitch for animals, logs or the like in which a hitching rope is passed around the object to be hitched or tied and then has both ends extending through a cylinder. A catch swingably connected to one rope end has elongated aligned handles which straddle the cylinder end so that tightening of the other rope end draws the cylinder against the object to hitch or tie the object as to a hitching post or the like.

The two aligned handles of the catch may have shoulders spaced apart a distance equal to the inner diameter of the cylinder to prevent any accidental lateral shifting of the catch with respect to the cylinder.

2 Claims, 3 Drawing Figures

QUICK HITCH FOR ANIMALS OR THE LIKE

SUMMARY OF THE INVENTION

An object of my invention is to provide a quick stay tie, such as a hitch for horses, logs, etc., which is very simple in structure and includes a cylinder through which a rope extends. A catch is swingably attached to one end of the rope and it can be swung so that the handles straddle one end of the cylinder. The rope then extends through the cylinder and the rope portion projecting beyond the cylinder is wrapped around the object being hitched, such as a horse, and then this rope portion again extends through the cylinder and is attached to a stake or other object. To free the hitch the catch is swung so that its aligned handles can pass through the cylinder.

A further object of my invention is to provide a modified form of the device in which the catch has a pair of shoulders engageable with the cylinder wall when the catch is in operative position and these shoulders will prevent the catch from accidentally shifting with respect to the cylinder and freeing the catch.

DESCRIPTION OF THE PREFERRED EMBODIMENTS

Figure 1:
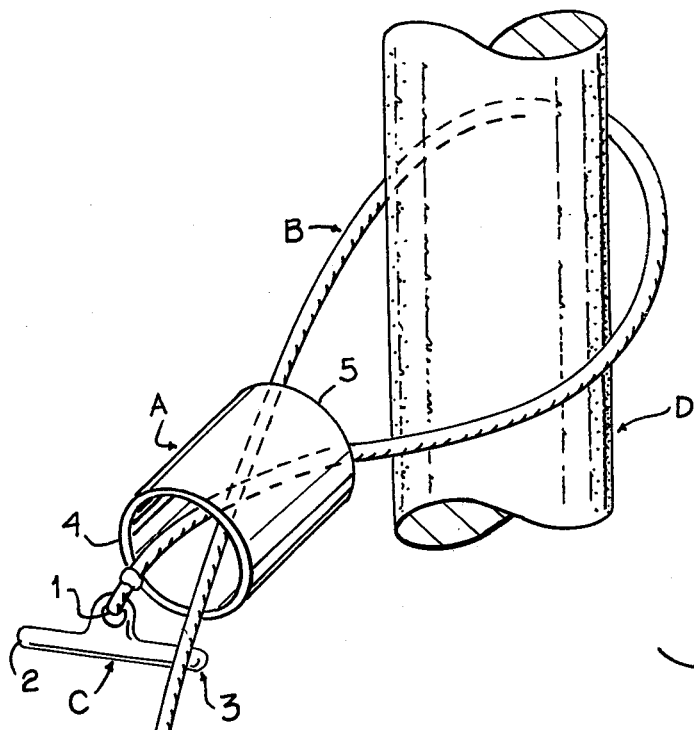
FIG. 1 shows the hitch being applied to an object which could be a log or the neck of a horse or other animal.
Figure 2:
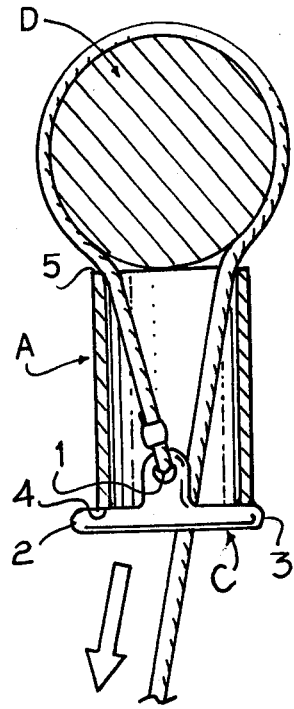
FIG. 2 is a central longitudinal section through the cylinder with the catch in operative position and the rope pulled taut around the animal's neck, the free end of the rope extending to and attached to a post or other object, not shown.

In carrying out my invention, I show a hollow cylinder A in FIGS. 1 and 2 that is open at both ends. A rope B has one end extending through the cylinder, and a catch C is swingably attached at 1 to this end of the rope. The catch has elongated handles 2 and 3 that are in alignment with each other and their total length is greater than the diameter of the cylinder and this permits the catch handles to straddle the cylinder and to contact the cylinder end 4, as shown in FIG. 2. As shown, the depth of the catch C is less than the inner diameter of the cylinder A. The portion of rope B extending beyond the other end 5 of the cylinder is wrapped around the object D to be hitched, such as a log or the neck of a horse.

In completing the hitch, the other end 6 of the rope is passed through the cylinder A and this end is pulled, after the catch C straddles the cylinder end 4, until the cylinder end 5 abuts the object D, see FIG. 2. The rope end 6 may be connected to a swivel E which in turn is adapted to be anchored to a hitching post or the like, not shown. When the person wishes to free the hitch, all he needs to do is to move the catch C away from the cylinder end 4 and then swing the catch so that its arms 2 and 3 will extend parallel to the cylinder axis. Then it is a simple matter to permit the catch to slide through the cylinder A as the cylinder is moved away from the object D.

Figure 3:
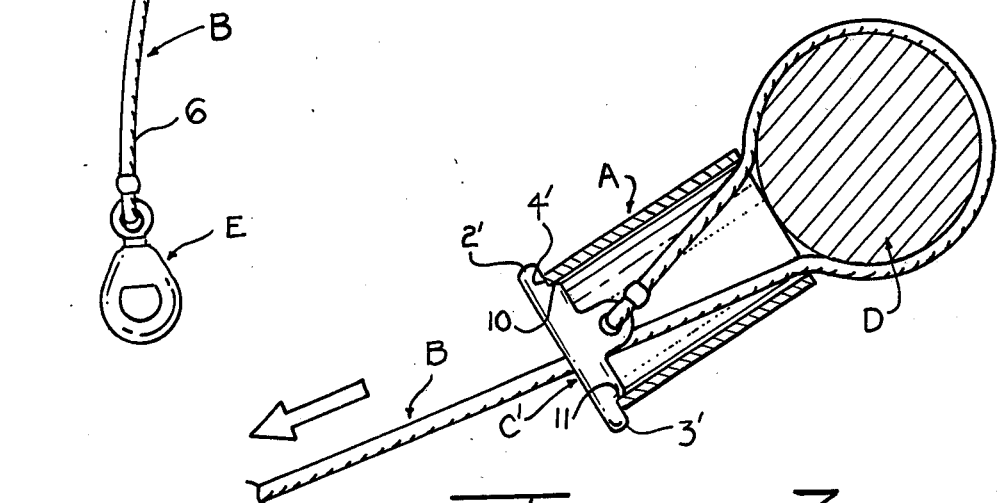
FIG. 3 is a view of a modified form of the device taken in the same plane as FIG. 2 and showing the catch with shoulders which contact the inner surface of the cylindrical wall when the catch is in operative position in order to prevent any lateral shifting of the catch with respect to the cylinder which might accidentally free the catch.

Modified Form of the Device, FIG. 3

In FIG. 3 I show the catch slightly modified from the catch C shown in FIGS. 1 and 2. The catch C' has its aligned handles 2' and 3' provided with shoulders 10 and 11, respectively. The distance betwen these two shoulders equals the inner diameter of the cylinder A. Therefore, when the catch C' is placed so that its arms 2' and 3' will contact the cylinder end 4', the shoulders 10 and 11 will be received within the cylinder interior and will contact the inner surface thereof so as to prevent any accidental lateral shifting of the catch with respect to the cylinder. In all other respects, the modified form of the device shown in FIG. 3 is the same as that shown in FIGS. 1 and 2, and no further description need be given.

I claim:

1. A device of the type described, comprising:
   (a) a cylinder open at both ends;
   (b) a rope with both ends extending through said cylinder and projecting from a first end thereof, the portion of rope projecting from the second end of said cylinder forming a loop and adapted to encircle an object to be hitched;
   (c) a catch swingably connected to a first end of said rope and having rigid handles aligned with each other and projecting equally beyond the point of connection with the rope end so that their total length is greater than the cylinder diameter; this first rope end being adapted to be pulled for bringing the handles into contact with said cylinder first end and then the rope loop being tightened about the object to bring the cylinder second end into contact therewith; and
   (d) a second rope end being adapted to be secured to an anchoring member, said catch being capable of being freed from said cylinder first end by being swung so the handles thereof substantially parallel the cylinder axis and permit the catch to move therough said cylinder for releasing the device from said object.

2. The combination as set forth in claim 1 and in which:
   (a) the two handles of said catch have shoulders receivable within said cylinder when said handles contact the first end of said cylinder, the distance between said shoulders being equal to the inner diameter of said cylinder so that the shoulders contact the inner surface of said cylinder and prevent any accidental lateral shifting of the catch with respect to said cylinder.

* * * * *